(12) United States Patent
Udagawa

(10) Patent No.: US 6,418,245 B1
(45) Date of Patent: Jul. 9, 2002

(54) DYNAMIC RANGE EXPANSION METHOD FOR IMAGE SENSED BY SOLID-STATE IMAGE SENSING DEVICE

(75) Inventor: Yoshiro Udagawa, Saitama-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/892,079

(22) Filed: Jul. 14, 1997

(30) Foreign Application Priority Data

Jul. 26, 1996 (JP) .............................................. 8-197644

(51) Int. Cl.[7] .............................. G06K 7/00; G06K 9/32; H04N 5/225; H04N 5/228
(52) U.S. Cl. ....................... 382/312; 382/284; 382/294; 382/318; 348/222; 348/262
(58) Field of Search ................................. 382/284, 294, 382/312; 348/222, 229, 256, 262, 303, 312, 318

(56) References Cited

U.S. PATENT DOCUMENTS

| | | | | |
|---|---|---|---|---|
| 4,647,975 A | * | 3/1987 | Alston et al. ................ | 348/222 |
| 4,926,247 A | * | 5/1990 | Nagasaki et al. ........... | 348/262 |
| 5,162,914 A | * | 11/1992 | Takahashi et al. .......... | 348/229 |
| 5,166,800 A | * | 11/1992 | Mori et al. .................. | 348/303 |
| 5,247,366 A | * | 9/1993 | Ginosari et al. ............ | 348/256 |
| 5,436,662 A | * | 7/1995 | Nagasaki et al. ........... | 348/312 |
| 5,517,242 A | * | 5/1996 | Yamada et al. ............. | 348/254 |
| 5,801,773 A | * | 9/1998 | Ikeda .......................... | 348/229 |
| 5,818,977 A | * | 10/1998 | Tansley ....................... | 382/294 |
| 5,828,793 A | * | 10/1998 | Mann .......................... | 382/284 |

* cited by examiner

Primary Examiner—Leo Boudreau
Assistant Examiner—Daniel G. Mariam
(74) Attorney, Agent, or Firm—Morgan & Finnegan, LLP

(57) ABSTRACT

An image sensing device senses an image of an object in a first luminous exposure in a predetermined image sensing position to obtain image data of the image, and a second luminous exposure which is different from the first luminous exposure is determined on the basis of the image data, and the image sensing device senses an image of an object again in the determined second luminous exposure and another image data is obtained. The image data of the two images sensed in two different luminous exposures is combined to generate image data of a single image of expanded dynamic range, and stored in a memory. Thereafter, the image sensing device is shifted to one or more predetermined positions by a pixel shifting unit, and two images are sensed at each position in the first and second luminous exposures, and image data of a single image of expanded dynamic range is obtained on the basis of the two images at each position. Thereafter, image data of a plurality of images of expanded dynamic range obtained at a plurality of image sensing positions is combined and image data of an image of high resolution is obtained.

34 Claims, 16 Drawing Sheets

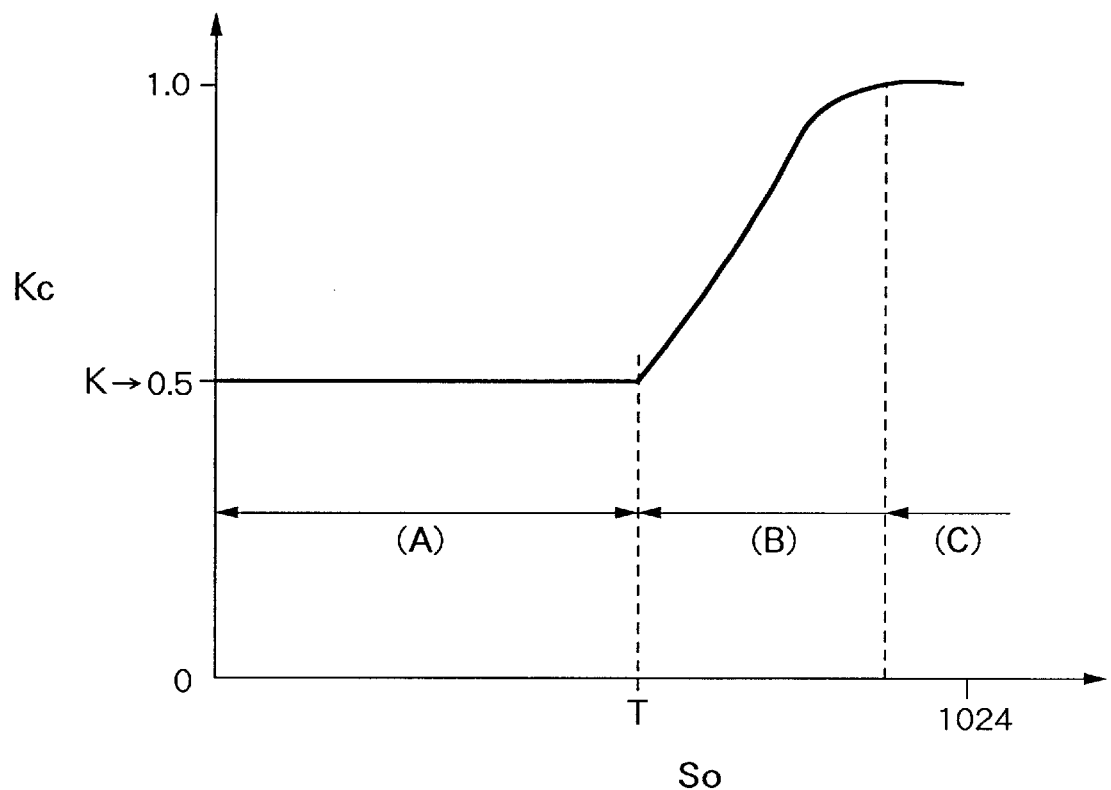

FIG.5A

| Cy | Ye | Cy |
|----|----|----|
| Mg | G  | Mg |
| Cy | Ye | Cy |

FIG.5B

| Cy | Ye | Cy |
|----|----|----|
| Mg | G  | Mg |
| Cy | Ye | Cy |

FIG.5C

| Cy | Ye | Cy |
|----|----|----|
| Mg | G  | Mg |
| Cy | Ye | Cy |

FIG.5D

| Cy | Ye | Cy |
|----|----|----|
| Mg | G  | Mg |
| Cy | Ye | Cy |

FIG.6A

| Cy | Ye |
|----|----|
| Mg | G  |

FIG.6B

| Cy | Ye |
|----|----|
| Mg | G  |

FIG.6C

| Cy | Ye |
|----|----|
| Mg | G  |

FIG.6D

| Cy | Ye |
|----|----|
| Mg | G  |

FIG.17

| | |
|---|---|
| A | 0EV |
| B | 0EV |
| C | 0EV |
| D | 0EV |
| E | 0EV |
| A | +1EV |
| B | +1EV |
| C | +1EV |
| D | +1EV |
| E | +1EV |

CONVENTIONAL EXAMPLE

| | |
|---|---|
| \} FIRST MEMORY 117 | |
| 0EV | |
| +1EV | |
| A EXPANSION | |
| B EXPANSION | |
| C EXPANSION | SECOND MEMORY 118 |
| D EXPANSION | |
| E EXPANSION | |

PRESENT INVENTION

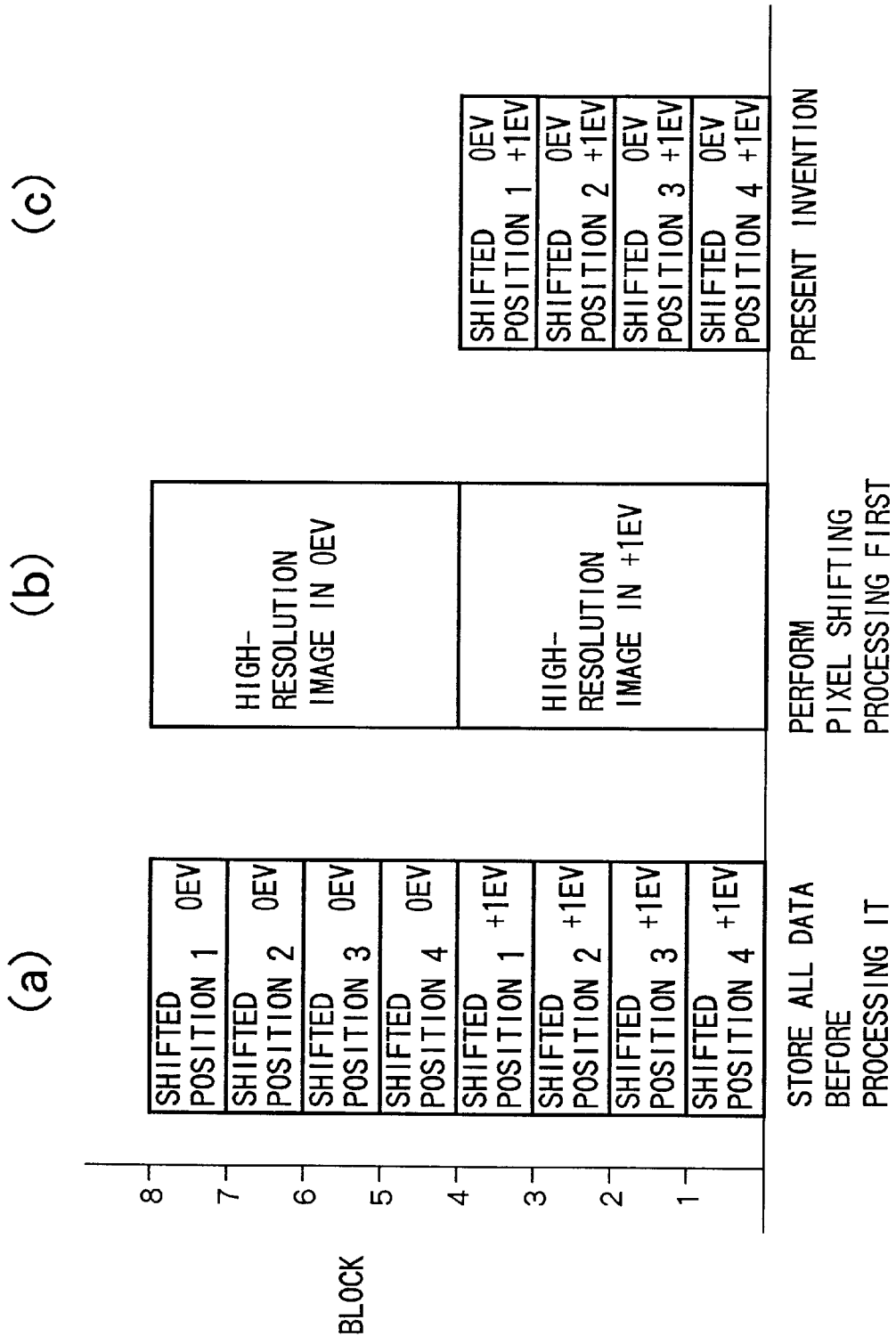

DYNAMIC RANGE EXPANSION METHOD FOR IMAGE SENSED BY SOLID-STATE IMAGE SENSING DEVICE

BACKGROUND OF THE INVENTION

The present invention relates to an image sensing method and apparatus and, more particularly, to a dynamic range expansion method for a high-resolution image sensed by an image sensing apparatus, such as a digital still camera.

Recently, quality of an image sensed by a digital still camera has been increased. This progress is greatly due to the improvement in resolution of a CCD (charge-coupled device) sensor, and decrease in price of memory. However, the resolution of a CCD is approaching a limit when it is attempted to increase the quality of an image only by increasing the resolution of the CCD. A CCD sensor having about 400,000 pixels is currently most popular, whereas, a currently demanded resolution is 1,500,000 pixels, and even further, 6,000,000 pixels. If it is attempted to realize such a high-resolution CCD sensor in a form of a CCD area sensor, the size of each pixel becomes very small, which causes deterioration in sensitivity and saturation level (i.e., dynamic range) drop.

Accordingly, as a method of improving the resolution of an image without increasing the number of pixels in a CCD sensor, "pixel shifting" technique as disclosed in the Japanese Patent Publication No. 50-17134 is known. In the pixel shifting method, a plurality of images sensed by a plurality of CCDs which are placed at different positions separated by a predetermined amount are combined to generate a single image of high resolution. Further, a method of combining a plurality of images sensed by a single CCD while shifting its position by a predetermined amount to obtain a single image of high resolution, such as the one disclosed in the Japanese Patent Publication No. 1-863, is also known.

Furthermore, as a method for obtaining an image of wide dynamic range without increasing the dynamic range of a CCD sensor, a method of sensing a plurality of images while changing luminous exposures and combining them, as disclosed in the Japanese Patent Application Laid-Open No. 59-54384, is known.

In the aforesaid conventional examples, however, the above two techniques involving pixel shifting processing and dynamic range expansion processing are written in different documents, and there is no discussion on integrated both technique. Therefore, when these two techniques are independently adopted for sensing an image of an object in order to improve quality of the image, there is a problem in which a huge memory area in a memory or memories is required.

For example, assuming the use of a single CCD of 1,500,000 pixels to obtain a dynamic-range-expanded image of 6,000,000 pixels, first, total of four images are to be sensed at a first position (reference position) and three other positions where the CCD is shifted in the vertical, horizontal, and oblique directions with respect to the reference position. Then, another four images for expanding dynamic range are to be sensed at a different luminous exposure at the above four positions. In other words, two images of 1,500,000 pixels has to be sensed in different luminous exposures at each of four positions, namely, eight (=4×2) images are to be sensed. If image data is analog-digital converted in depth of ten bits, then, $$1,500,000(\text{pixels}) \times 10(\text{bits})/8(\text{bits}) \times 8(\text{images}) = 15(\text{MB})$$

Thus, a very large memory area is needed.

SUMMARY OF THE INVENTION

The present invention has been made in consideration of the above situation, and has as its object to obtain a dynamic-range-expanded image of high resolution while consuming a smaller memory area without increasing the number of pixels of an image sensing device, such as a CCD.

According to the present invention, the foregoing object is attained by providing an image sensing method comprising: an image sensing step of obtaining image data of a plurality of images of an object in a plurality of different luminous exposures; a dynamic range expansion step of combining the image data obtained in the image sensing step and generating image data of a single image of expanded dynamic range; a shifting step of shifting an image formation position of the images of the object on an image sensing device to one or more positions; a repeating step of repeating the image sensing step and the dynamic range expansion step at each image formation position shifted by the shifting step and generating image data of a plurality of images of expanded dynamic range; and a combining step of combining the plurality of images of expanded dynamic range obtained in the repeating step and generating image data of a single image of high resolution.

According to the present invention, the foregoing object is also attained by providing an image sensing apparatus comprising: image sensing means for sensing a plurality of images of an object in a plurality of different luminous exposures and outputting the image data of the plurality of images; first storage means for storing the image data of the plurality of images of the object sensed by the image sensing means in the plurality of different luminous exposures; dynamic range expansion means for combining the image data stored in the first storage means and generating image data of a single image of expanded dynamic range; second storage means for storing image data of a plurality of images obtained by the dynamic range expansion means; shifting means for shifting an image formation position of an image of the object on the image sensing means to one or more positions; and combining means for combining the image data of the plurality of images stored in the second storage means and generating image data of a single image of high resolution.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a graph for explaining a coefficient and a threshold used in dynamic range expansion processing;

FIG. 4 is an explanatory view for explaining mode (a) according to the first embodiment;

FIGS. 5A to 5D are explanatory views for explaining pixel shifting operation in mode (b) according to the first embodiment;

FIGS. 6A to 6D are explanatory views for explaining pixel shifting operation in mode (c) according to the first embodiment;

FIG. 17 is an explanatory view showing the difference in memory size required in the conventional image sensing system and in the image sensing system of the present invention; and FIG. 18 is an explanatory view showing an effect of the present invention.

DETAILED DESCRIPTION OF THE PREFERRED EMBODIMENTS

Preferred embodiments of the present invention will be described in detail in accordance with the accompanying drawings.

<First Embodiment>

As a first embodiment of the present invention, a case where the present invention is applied to a digital still camera system having a CCD of 1,500,000 pixels covered with a complementary color mosaic filter is explained.

Figure 1:
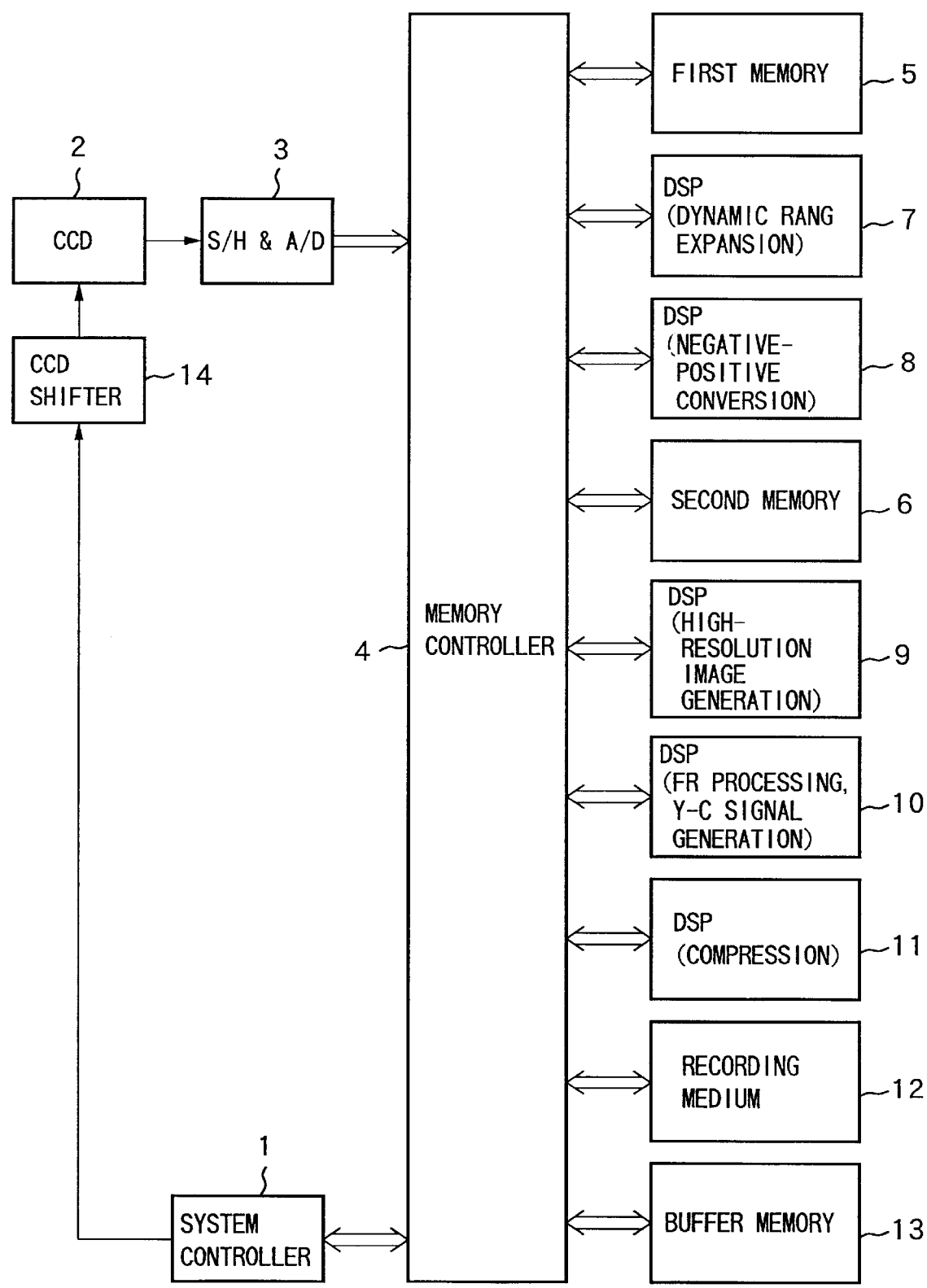
FIG. 1 is a block diagram illustrating a configuration of an image sensing system according to a first embodiment of the present invention.

FIG. 1 is a block diagram illustrating a configuration of a digital still camera system according to the first embodiment.

Referring to FIG. 1, when a shutter button (not shown) is pressed, a system controller 1 operates a CCD 2 via a driver circuit (not shown), thereby image sensing operation is performed, and an image is sensed. The data of the sensed image (image data) is processed by a sample-and-hold (S/H) and analog-digital (A/D) converter 3, and stored in a buffer memory 13 as ten-bit digital signals via a memory controller 4. Thereafter, the digital image signals are processed by various digital signal processors (DSPs) 7 to 11 via a first memory 5 and a second memory 6, then recorded on a recording medium 12. Note, the processes performed by the DSPs 7 to 11 will be explained later. Further, a CCD shifter 14 shifts the position of the CCD 2 in the direction perpendicular to an optical axis. Pixel shifting operation performed by the CCD shifter 14 will be explained later.

Next, principles of dynamic range expansion processing and pixel shifting processing according to the first embodiment will be explained.

(Dynamic Range Expansion Processing).

Figure 2:
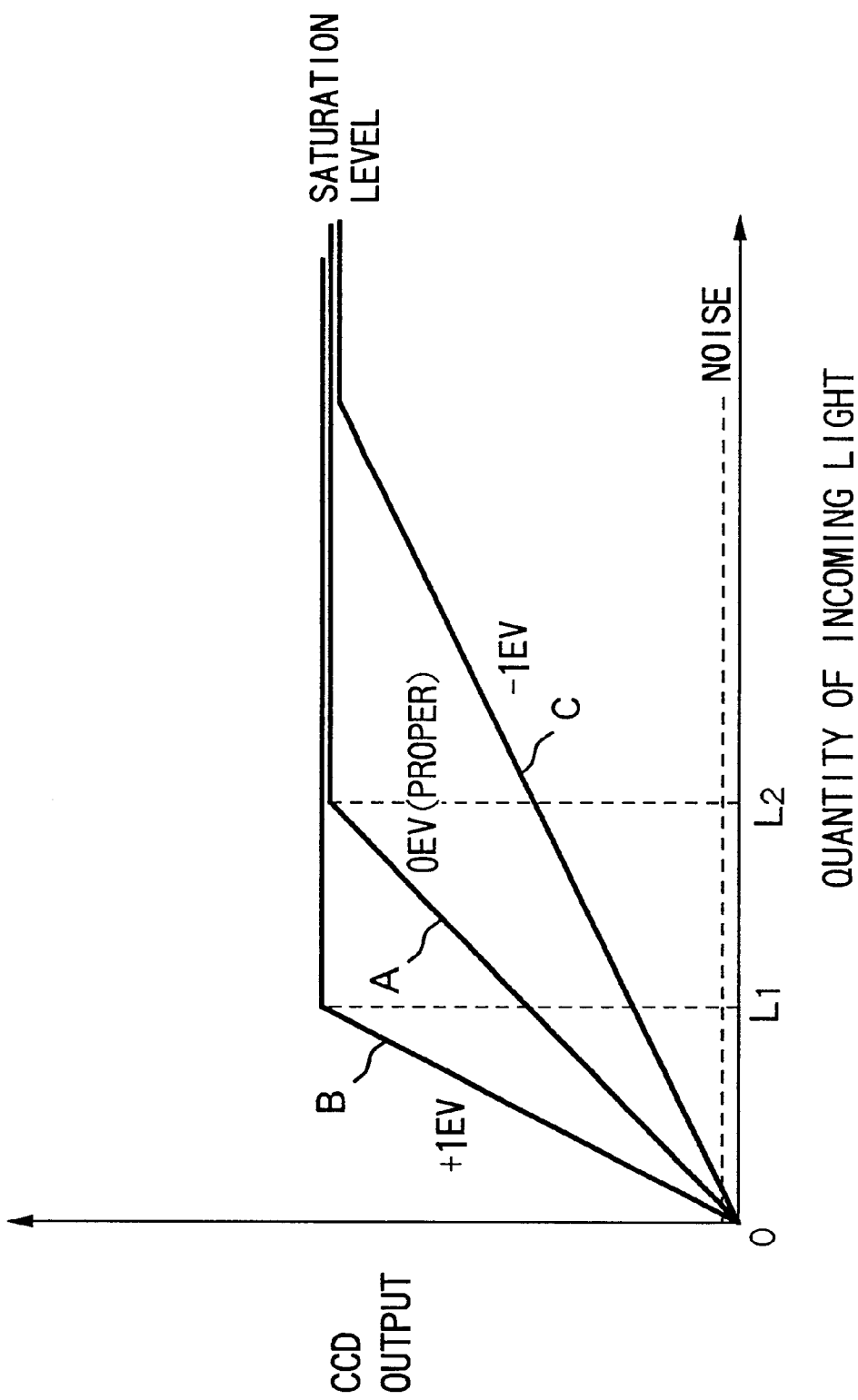
FIG. 2 is a graph showing relationship between quantity of incoming light and output from a CCD when luminous exposures differ.

FIG. 2 is a graph showing relationship between quantity of incoming light and output from the CCD 2 (referred as "CCD output", hereinafter). Line A in FIG. 2 shows the level of the CCD output with respect to the quantity of incoming light when an image is sensed under proper luminous exposure condition (indicated as "0 EV" for reference exposure value). Here, conditions to be a "proper" luminous exposure are not defined precisely, however, they can be arbitrary decided to a luminous exposure which a user, a manufacturer, and so on, generally consider the luminous exposure is proper. Referring to the line A, the CCD output increases in proportion to the quantity of incoming light, then reaches a saturation level. Therefore, the dynamic range of the CCD 2 is determined by the quantity of light, $L_2$, with which the CCD output of the line A reaches the saturation level.

In contrast, line B shows the level of CCD output with respect to the quantity of incoming light when luminous exposure is doubled with respect to 0 EV (indicated as "+1 EV"). Since the luminous exposure is doubled, the CCD output with respect to a given quantity of light is twice larger than that in the line A. However, the dynamic range in the line B is halved, namely, to $L_1$, which is one half of the dynamic range in the line A. Further, since the level of CCD output with respect to a given quantity of light in the line B is twice larger than that in the line A, as mentioned above, the S/N ratio is improved by twice when the noise level is assumed to be constant.

Further, line C shows the level of CCD output with respect to the quantity of incoming light when luminous exposure is halved with respect to 0 EV (indicated as "−1EV"). In the line C, the dynamic range is twice larger than that in the line A, however, the S/N ratio drops. Therefore, by combining three images sensed in the aforesaid three different luminous exposures, it is possible to obtain a single image of high quality having expanded dynamic range and a better S/N ratio.

More specifically, consider the quantity of light, $L_1$ and $L_2$, as thresholds, then, the CCD outputs are combined in accordance with the following table 1:

TABLE 1

| Quantity of light | Signal values to be used |
| --- | --- |
| $0 \sim L_1$ | signal values in +1 EV × ½ |
| $L_1 \sim L_2$ | signal values in 0 EV × 1 |
| $L_2 \sim \infty$ | signal values in −1 EV × 2 |

Below, a case where generating a single image by using CCD output obtained in 0EV and CCD output obtained in either +1 EV or −1 EV from a single CCD covered with a complementary color filter is explained.

First, an image is sensed in the proper luminous exposure (0 EV), and a histogram of frequency of occurrence vs. the level of CCD output is generated on the basis of the obtained image data. The histogram may be generated on the basis of image data of each color of the complementary color filter, namely, cyan (Cy), magenta (Mg), yellow (Ye), and green (G), or of image data of only one color which is likely saturated first (e.g., Y). By analyzing the histogram or histograms, if it is determined that the number of pixels (i.e., frequency of occurrence) having values which are larger than a predetermined threshold (in level of CCD output) exceeds a predetermined value, it is considered that there are many saturated pixels in the image, and another image is sensed in the luminous exposure of −1 EV. Whereas, if the number of pixels having values which are larger than a predetermined threshold does not exceed a predetermined value, then it is considered that there are wide dark portion in the image, and another image is sensed in the luminous exposure of +1 EV. Thus, depending upon the brightness of the image, whether to decrease the number of saturated pixels or to improve the S/N ratio is determined. Accordingly, it is possible to effectively reduce the amount of image data needed for realizing dynamic range expansion.

Next, a case of combining image data obtained in 0 EV and image data obtained in +1 EV as a result of analysis of the histogram or histograms is described.

First, between image signals SS0 of an image sensed in 0 EV and image signals SS1 of an image sensed in +1 EV, cyan image data of a pixel, p1, having the same address are compared, and a ratio, Kc(p1), of the cyan image data of the pixel p1 is obtained.

$$Kc(p1)=SS0(p1)/SS1(p1)$$

The ratio Kc(pn) (pn denotes an arbitrary pixel) is obtained for all the pixels or for predetermined pixels. A line of the ratio Kc with respect to the level of the image signals SS0, expressed in ten bits, is shown in FIG. 3. In FIG. 3, an region (A) is where the CCD output and the quantity of light have linear relationship both in 0 EV and +1 EV; an region (B), the CCD output and the quantity of light have linear relationship in 0 EV, but pixels of the CCD are saturated in +1 EV; and an region (C), the pixels of the CCD are saturated both in 0 EV and +1 EV. In the region (A), the ratio Kc is 0.5 which represents the difference in luminous exposure between 0 EV and +1 EV in the graph shown in FIG. 3, however, the ratio Kc is not always 0.5 due to unevenness of shutter speed, for example, in practice. As seen from the graph in FIG. 3, the selection between the image signals SS0 and SS1 is performed with respect to a threshold T (corresponds to the light exposure L1 in FIG. 2).

When the level of an image signal SS0(pn) of an arbitrary pixel pn obtained in 0 EV is under the threshold T, then the image signal SS1(pn), obtained in +1 EV, of the pixel having the identical address is used after it is multiplied by a constant K (=Kc=0.5, in this case) (corresponds to luminous exposure between 0 and $L_1$ in the table 1). Whereas, when the level of an image signal SS0(pn) of an arbitrary pixel (pn) obtained in 0 EV is equal or greater than the threshold T, since the image signal SS1(pn) obtained in +1 EV is a saturated value, the image signal SS0(pn) is used (corresponds to luminous exposure between $L_1$~$L_2$, and $L_2$~∞ in the table 1, since image signals of two images sensed in 0 EV and +1 EV are combined in this case).

Similarly, the constant K and the threshold T are obtained for magenta, green and yellow image signals.

(Pixel Shifting Processing)

Next, an pixel shifting processing is explained.

FIGS. 4 to 6D show color arrangement of a complementary color filter on the CCD and relative positions of the CCD when pixel shifting processing is performed according to the first embodiment.

There are three sensing modes considered in the first embodiment. They are, (a) Obtain a single image of 1,500,000 pixels with a 1,500,000-pixel CCD at a single position (FIG. 4);

(b) Obtain a single image of 6,000,000 pixels on the basis of luminance data of four images of 1,500,000 pixels sensed at four positions by shifting a 1,500,000-pixel CCD by half pixel in the horizontal and/or vertical directions, and color data of an image of 1,500,000 pixels sensed at one of the above four positions (FIGS. 5A to 5D); and (c) Obtain a single image of 1,500,000 pixels on the basis of four 1,500,000-pixel images sensed at four positions by shifting 1,500,000-pixel CCD by one pixel (FIGS. 6A to 6D).

The difference between the mode (b) and the mode (c) is whether to give luminance signals priority or to give color signals priority, and the modes (b) and (c) can be selected by a switch (not shown) in the camera system.

Next, generation of a luminance signal in the modes (b) and (c) is explained.

In the mode (b), after the image signals of four images, sensed as shown in FIGS. 5A to 5D, are rearranged, luminance signals are obtained as follow.

| | |
|---|---|
| Cy(1), Cy(2), Ye(1), Ye(2), . . . | (first line) |
| Cy(4), Cy(3), Ye(4), Ye(3), . . . | (Second line) |
| Mg(1), Mg(2), G(1), G(2), . . . | (third line) |
| Mg(4), Mg(3), G(4), G(3), . . . | (fourth line) |

Here, Cy, Ye, Mg and G represents luminance signals which the complementary color filter of corresponding color contributes, and the numbers in parentheses, namely, (1), (2), (3) and (4), corresponds to the image sensing position shown in FIGS. 5A to 5D, respectively. Accordingly, the image signals rearranged as above are as though they are obtained with a CCD having twice higher density both in the vertical and horizontal directions than that of the CCD used in practice. Therefore, an image of 1,500,000×4 pixels, namely, 6,000,000 pixels is obtained.

In mode (c), since each of Cy, Mg, Ye and G signals are obtained for each pixels, R, G and B signals are obtained for each pixel by performing the following matrix operation (Equation 1).

$$\begin{pmatrix} R \\ G \\ B \end{pmatrix} = MAT \begin{pmatrix} Cy \\ Mg \\ Ye \\ G \end{pmatrix} \qquad \text{Equation 1}$$

where MAT is a 3×4 matrix.

Next, luminance signal Y is obtained on the basis of the R, G and B signals according to the following equation 2.

$$Y=0.3R+0.6G+0.1B \qquad \text{Equation 2}$$

The aforesaid calculations in accordance with the equations 1 and 2 are performed on all the 1,500,000 pixels (top and bottom end portions and/or right and left end portions of an image may be excluded) to obtain the luminance signals.

Next, sequences of overall image sensing operation in the modes (b) and (c), namely, in the case where pixel shifting operation is performed, according to the first embodiment are explained.

<<Mode (b): Pixel Shifting by Half Pixel>>

Figure 7:
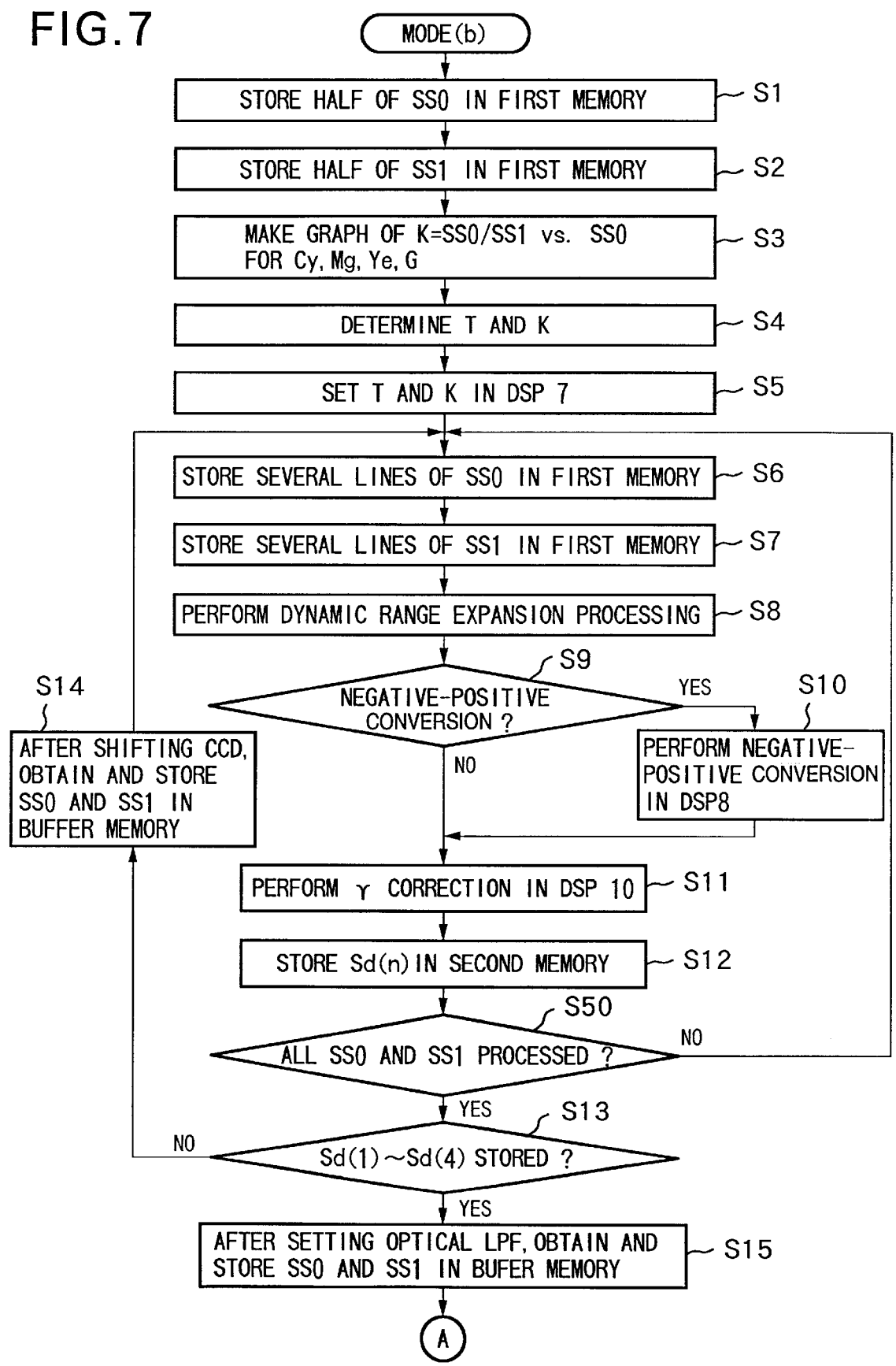
FIG. 7 is a flowchart showing an operation of the mode (b)
Figure 8:
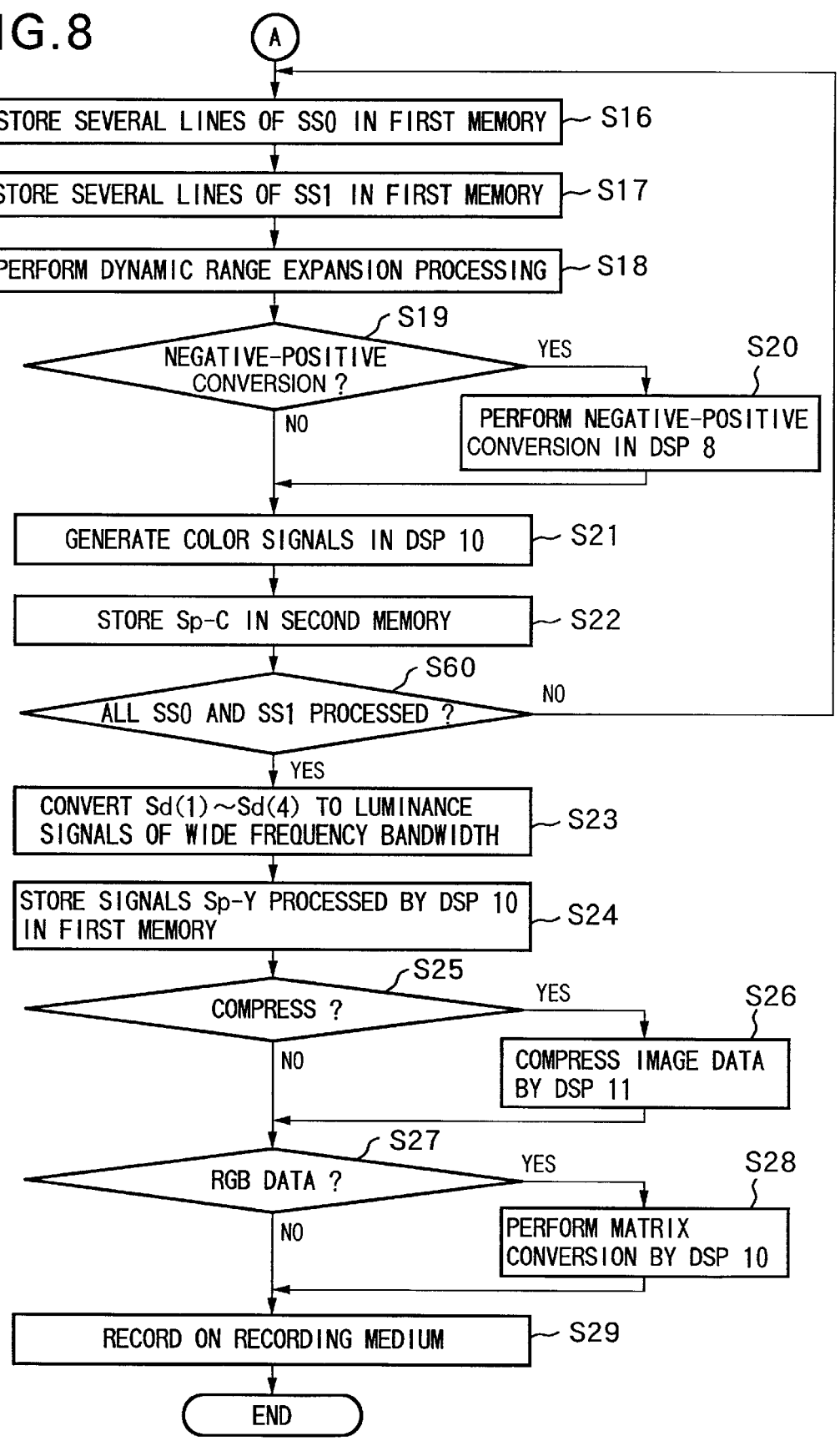
FIG. 8 is a flowchart showing the operation of the mode (b)
Figure 9A:
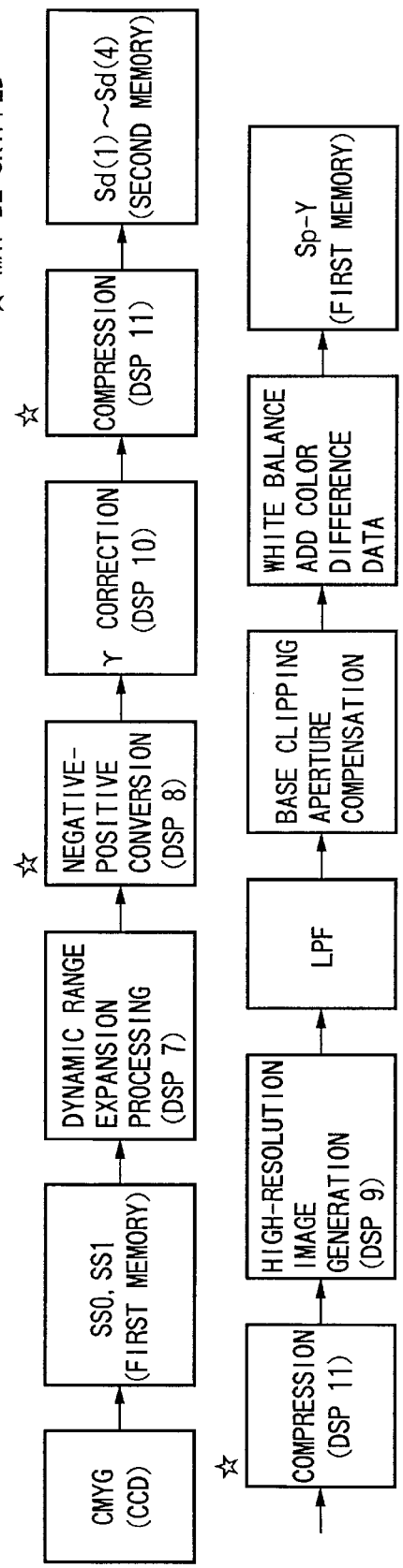
FIGS. 9A and 9B are sequential charts showing flow of image signals in the image sensing system in the mode (b)
Figure 9B:
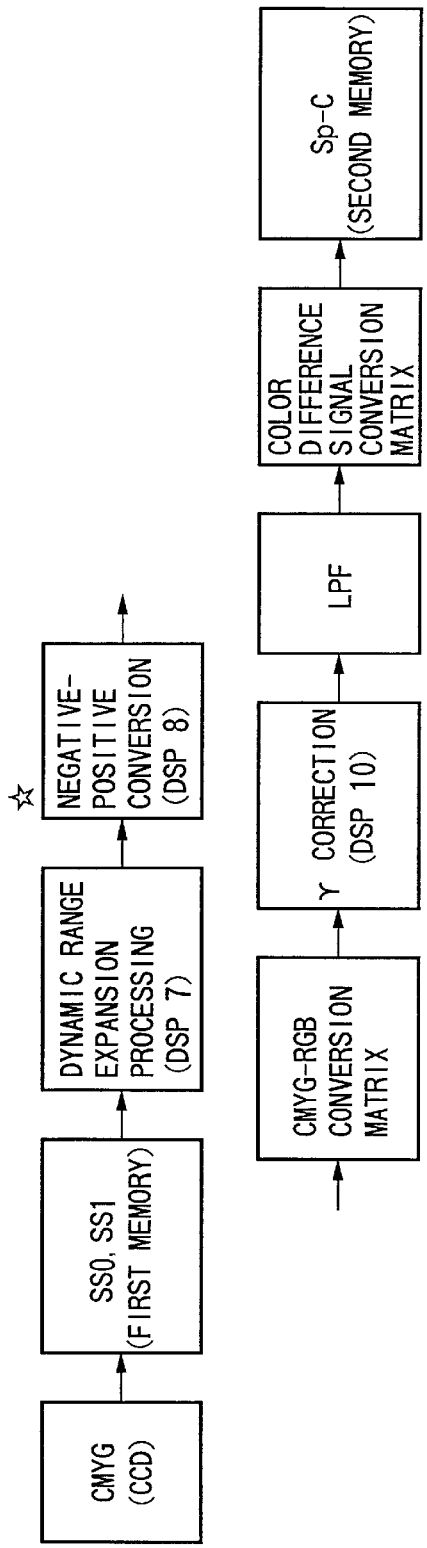

FIGS. 7 and 8 are flowcharts showing an operation in the mode (b), and FIGS. 9A and 9B is a sequential chart showing flow of image signals in the image sensing system in the operation shown in FIGS. 7 and 8.

Here, a case for combining image data obtained in 0 EV and image data obtained in +1 EV as a result of analyzing a histogram showing the relationship between the level of the image data and the frequency of occurrence generated on the basis of the image data obtained in 0 EV is explained. Image signals SS0 which are obtained for generating the histogram and image signals SS1 which are obtained in +1 EV as a result of the analysis of the histogram are stored in the buffer memory 13. It should be noted that, when combining image data obtained in 0 EV and image data obtained in −1 EV, similar processes to those explained below are performed.

First at step S1, one half of the image signals SS0 (interlaced), obtained in a proper exposure (i.e., 0 EV) and stored in the buffer memory 13, are stored in the first memory 5. Next at step S2, one half of the image signals SS1 (interlaced), obtained in +1 EV and stored in the buffer memory 13, are stored in the first memory 5. Then, ratios SS0/SS1 are calculated for image data of each color, Cy, Mg, Ye and G, and a graph showing relationship between the output level of the image signals SS0 and the calculated ratios, as shown in FIG. 3, is made for each color at step S3. Then at step S4, a threshold T used for selecting signals to be used and a constant K used as a coefficient when the image signals SS1 are selected are determined. At step S5, the threshold T and the constant (coefficient) K obtained at step S4 are set in the DSP 7 for dynamic range expansion. Thereby, the threshold T and the coefficient K set in the DSP 7 are used in the dynamic range expansion processing for obtaining an image of high resolution in the rest of the processes in FIGS. 7 and 8.

At step S6, several lines of the image signals SS0 obtained in 0 EV are moved from the buffer memory 13 to the first memory 5, and at step S7, several lines of the image signals SS1 obtained in +1 EV are moved from the buffer memory 13 to the first memory 5. Thereafter, these image signals SS0 and SS1 are transmitted to the DSP 7 where the dynamic range expansion processing, as described above, is performed on the image signals SS0 and SS1 by using the threshold T and the coefficient K at step S8. At this point, the first memory 5 is cleared.

After the dynamic range expansion processing is completed, then the process proceeds to step S9 where whether the negative-positive conversion is to be performed or not is determined. If "YES" at step S9, then the process moves to step S10 where tone processing, for instance, is performed by the DSP 8 for negative-positive conversion, and proceeds to step S11. If "No" at step S9, then the process directly moves to step S11. At step S11, γ correction is performed by the DSP 10 for frame processing and luminance/color signal generation, and the image signals Sd(n) (n: 1 to 4, n corresponds an image obtained at each position of CCD shown in FIGS. 5A to 5D, respectively. Eight-bit luminance data) obtained at step S11 are stored in the second memory 6 at step S12. Note, an amount of image signals processed in one flow from steps S6 to S12 can be determined depending upon the capacity of the first memory 5.

Next at step S50, whether the processes in steps S6 to S12 have been applied to all the image signals SS0 and SS1 or not is determined. If "NO", then the process returns to step S6 and the processes in S6 to S12 are repeated until all the image signals SS0 and SS1 are processed. Whereas, if "YES" at step S50, then the process moves to step S13, and whether all the image signals Sd(n), corresponding to images obtained at all the positions shown in FIGS. 5A to 5D, are stored or not is determined.

If "NO" at step S13, then the CCD 2 is shifted by a predetermined amount (by half-pixel distance in the mode (b)) at step S14, image signals SS0 and SS1 are obtained in 0 EV and +1 EV, respectively, at the moved position and stored in the buffer memory 13, then the processes in steps S6 to S12 are repeated. Whereas, if it is determined that the image signals Sd(n) obtained by applying dynamic range expansion processing on all the images sensed at all the positions shown in FIGS. 5A to 5D are stored in the second memory 6 ("YES" at step S13), then the process moves to step S15.

At step S15, an optical low-pass filter (LPF) is set in a light path, images are sensed in 0 EV and +1 EV, then obtained image signals SS0 and SS1 are stored in the buffer memory 13. At step S16, several lines of the image signals SS0 obtained in 0 EV are moved from the buffer memory 13 to the first memory 5, and at step S17 several lines of the image signals SS1 obtained in +1 EV are moved from the buffer memory 13 to the first memory 5. Thereafter, these image signals SS0 and SS1 are transmitted to the DSP 7 where the dynamic range expansion processing, as described above, is performed on the image signals SS0 and SS1 by using the threshold T and the coefficient K at step S18. At this point, the first memory 5 is cleared.

After the dynamic range expansion processing is completed, then the process proceeds to step S19 where whether the negative-positive conversion is to be performed or not is determined. If "YES" at step S19, then the process moves to step S20 where tone processing, for instance, is performed by the DSP 8 for negative-positive conversion, and proceeds to step S21. If "No" at step S19, then the process directly moves to step S21. At step S21, color signals are generated by the DSP 10 for frame processing and luminance/color signal generation, and the image signals Sp-C (Eight-bit color data) obtained at step S21 are stored in the second memory 6 at step S22.

Next at step S60, whether the processes in steps S16 to S22 have been applied to all the image signals SS0 and SS1 or not is determined. If "NO", then the process returns to step S16 and the processes in S16 to S22 are repeated until all the image signals SS0 and SS1 are processed.

If "YES" at step S60, then the process moves to step S23 where the image data Sd(1) to Sd(4) stored in the second memory 6 are converted into luminance signals of wide frequency bandwidth by the DSP 9 for high-resolution image generation, then transmitted to the DSP 10 for frame processing and luminance/color signal generation. At step S24, the transmitted luminance signals are processed by the DSP 10, then resultant image signals Sp-Y (eight-bit luminance data) are stored in the first memory 5. By the above transmission, the available first memory 5 is effectively utilized without unnecessarily increasing the capacity of the second memory 6.

Next, whether to compress the image data or not is determined at step S25 and if "YES", the image data is compressed by the DSP 11 for compression conforming to Joint Photographic Expert Group (JPEG), for example, at step S26. After the image data is compressed, the process proceeds to step S27. If "NO" at step S25 then the process directly moves to step S27.

At step S27, whether or not the data is RGB data is determined. If it is RGB data, then the process moves to step S28 where luminance signals Sp-Y of wide frequency bandwidth are processed by the DSP 10 for frame processing and luminance/color signal generation, and stored in the first memory 5. Thereafter, the process proceeds to step S29. If it is determined that the data is not RGB data at step S27, then the process directly moves to step S29.

At step S29, the image signals are recorded on the format conforming to the recording medium 12. Note, if the image data have been compressed, it is recorded by a 8×8 block, whereas if not, the processed blocks are recorded as strip data.

<<Mode (c): Pixel Shifting by One Pixel>>

Referring to flowcharts shown in FIGS. 10 and 11, processing in the mode (c) is explained below. FIG. 12 is a sequential chart showing flow of image signals in the image sensing system in the processing shown in FIGS. 10 and 11.

Figure 10:
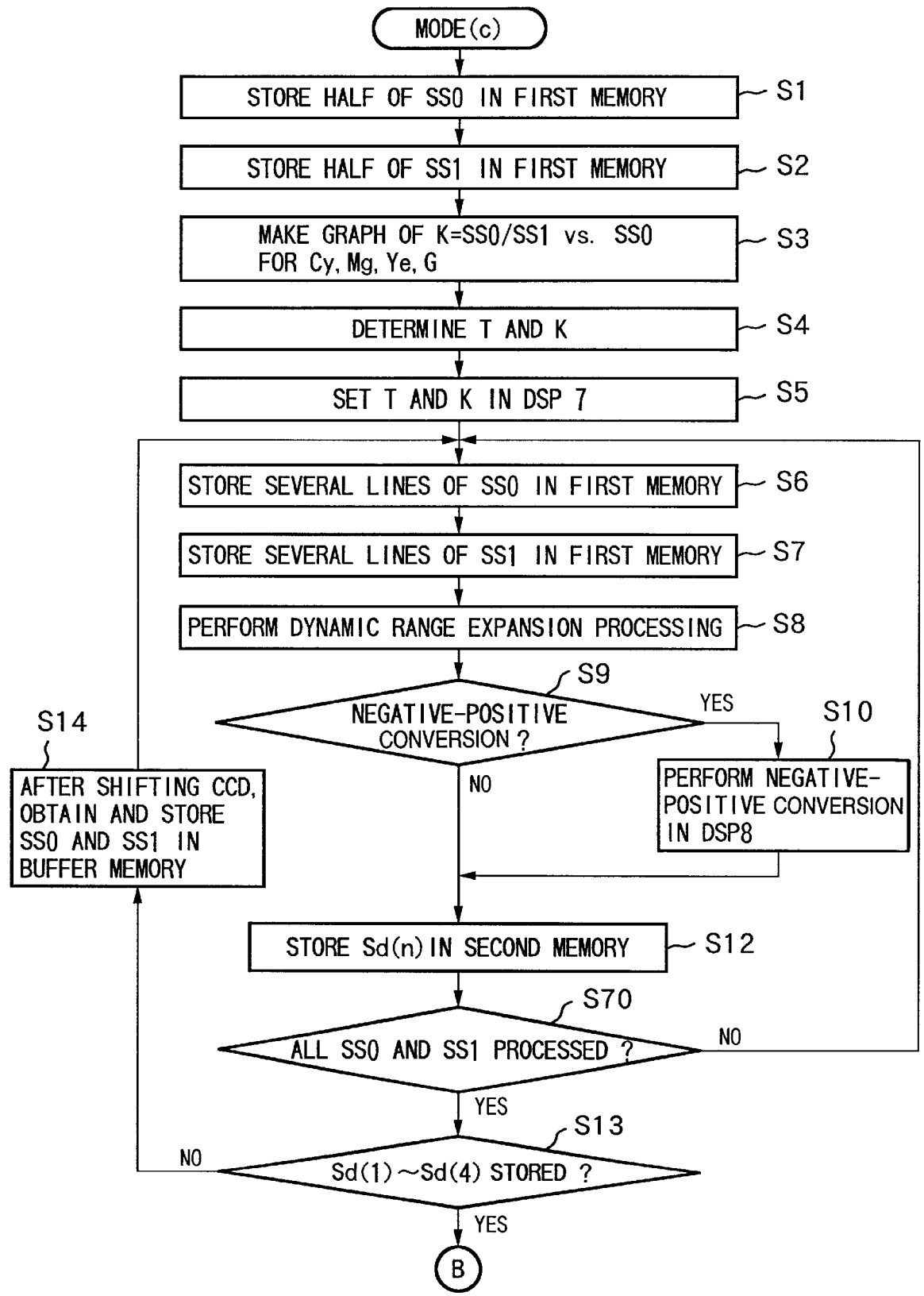
FIG. 10 is a flowchart showing an operation of the mode (c)

In FIG. 10, all the processes in steps S1 to S13 except step S11 are the same as those explained with reference to FIG. 5. In FIG. 10, the step S11 in FIG. 5 is omitted, and the data which is dealt with at steps S12 and S13 is ten-bit CMYG data.

At step S13, if it is determined that all the image signals Sd(n) (n: 1 to 4, corresponds to image sensing positions shown in FIGS. 6A to 6D, respectively) of the images sensed at all the positions shown in FIGS. 6A to 6D, obtained by applying dynamic range expansion processing, are not stored in the second memory 6 ("NO" at step S13), then the CCD 2 is shifted by a predetermined amount (by one pixel distance in the mode (c)) at step S14, image signals SS0 and SS1 obtained in 0 EV and +1 EV, respectively, at the moved position are stored in the buffer memory 13, then the processes in steps S6 to S12 are repeated.

Figure 11:
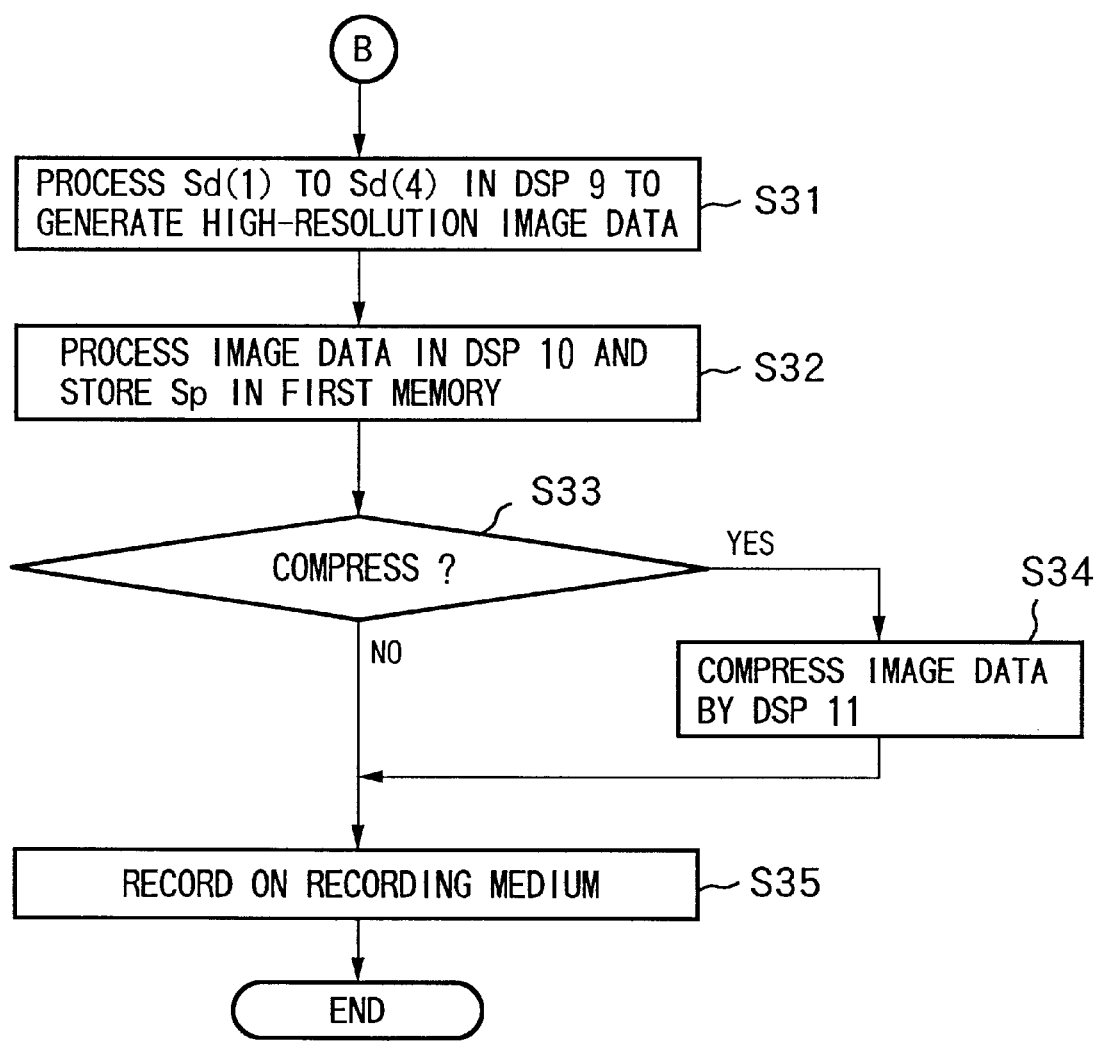
FIG. 11 is a flowchart showing the operation of the mode (c)
Figure 12:
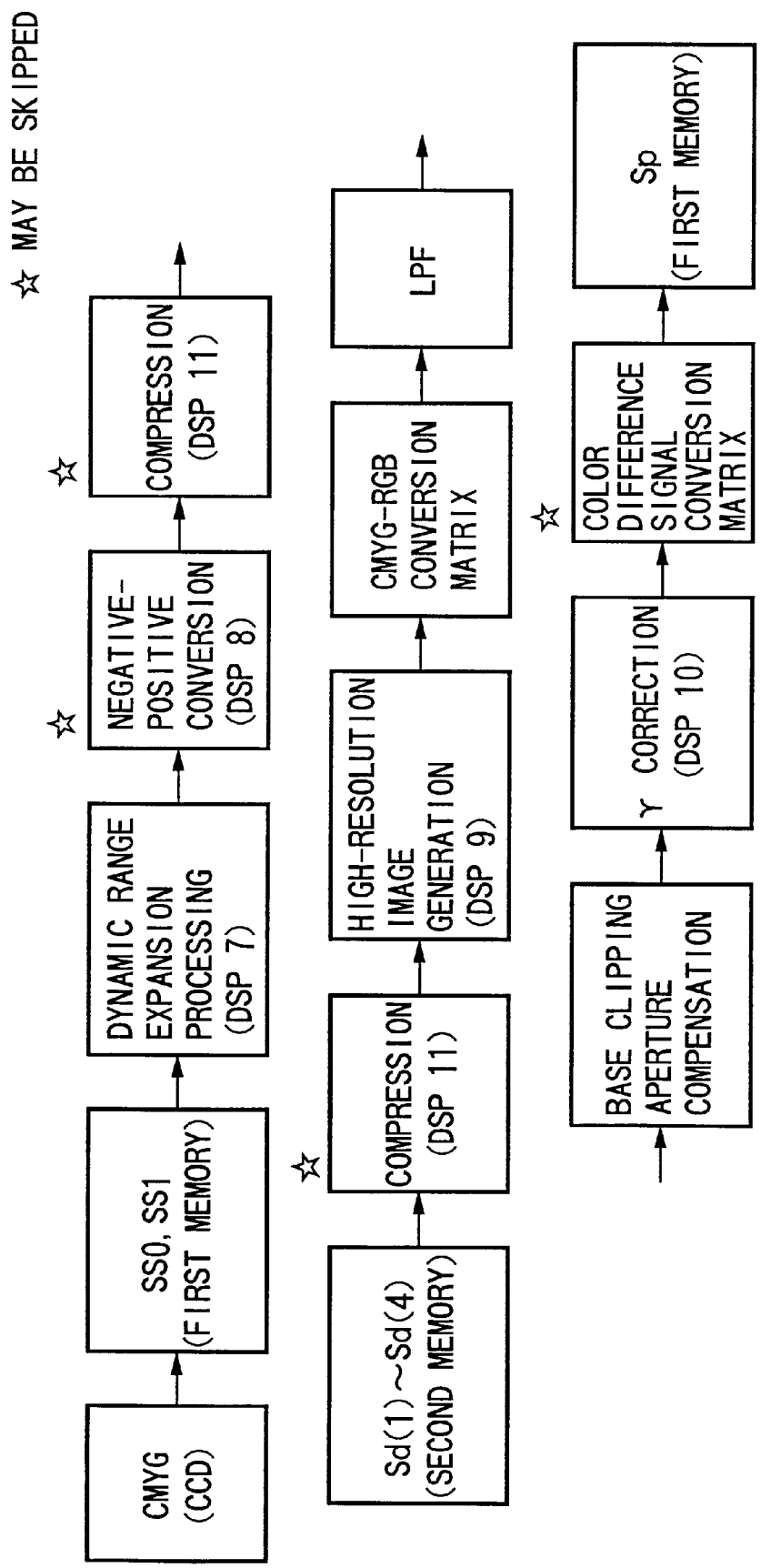
FIG. 12 is a sequential chart showing flow of image signals in the image sensing system in the mode (c)

Whereas, if it is determined that all the image signals Sd(1) to Sd(4) are stored in the second memory 6, then the process moves to step S31 in FIG. 11. At step S31, the image signals Sd(1) to Sd(4) stored in the second memory 6 are converted into high-resolution image signals by the DSP 9 for high-resolution image generation, then transferred to the DSP 10 for frame processing and luminance/color signal generation. At step S32, the transferred high-resolution image signals are processed by the DSP 10, and the resultant image signals Sp (eight-bit luminance/color data or RGBγ data) are stored in the first memory 5. By the above transmission, the available first memory 5 is effectively utilized without unnecessarily increasing the capacity of the second memory 6.

Next, whether to compress the image data or not is determined at step S33, and if "YES", the image data is compressed by the DSP 11 for compression conforming to Joint Photographic Expert Group (JPEG), for example, at step S34. After the image data is compressed, the process proceeds to step S35. If "NO" at step S33, then the process directly moves to step S35.

At step S35 the image signals are recorded on the format conforming to the recording medium 12. Note, if the image data have been compressed, it is recorded by a 8×8 block, whereas if not, the processed blocks are recorded as strip data.

It is possible to compress the image signals Sd(1) to Sd(4) by using the DSP 11 for compression before the image signals Sd(1) to Sd(4) are written in the second memory 6 in step S12 in FIGS. 7 and 10. By doing so, the required capacity of the second memory 6 is reduced. Further, as for compression method, it is possible to compress the image signals Sd(1) to Sd(4) independently, however, it is possible to compress the image signals Sd(1) to Sd(4) by using correlation between each signals, since the image signals Sd(1) to Sd(4) have strong correlation between each other. For instance, the image signals Sd(1) and difference data of the image signals Sd(2) to Sd(4) with respect to the image signals Sd(1) may be stored.

<<Mode (a): General Image Sensing>>

Figure 13:
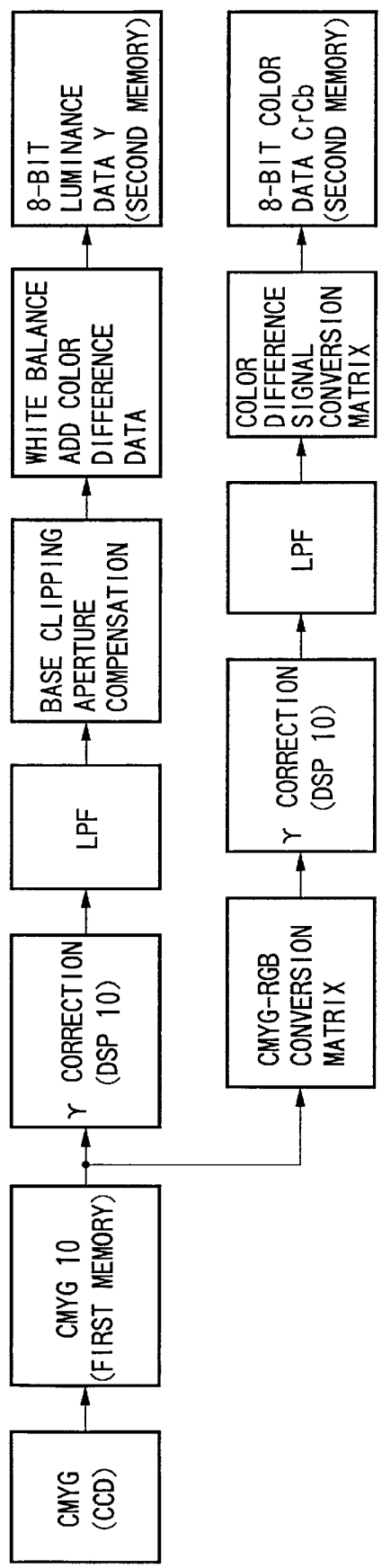
FIG. 13 is a sequential chart showing flow of image signals in the image sensing system in the mode (a)

Flow of image signals in the image sensing system when performing only dynamic range expansion processing and not performing pixel shifting operation is shown in FIG. 13. In this case, the processes in steps S1 to S12 shown in FIG. 7 are performed on all the image signals SS0 and SS1, obtained in 0 EV and +1 EV in one image sensing operation, and stored in the buffer memory 13. Then, image signals whose dynamic range is expanded are processed thereafter.

Figure 14:
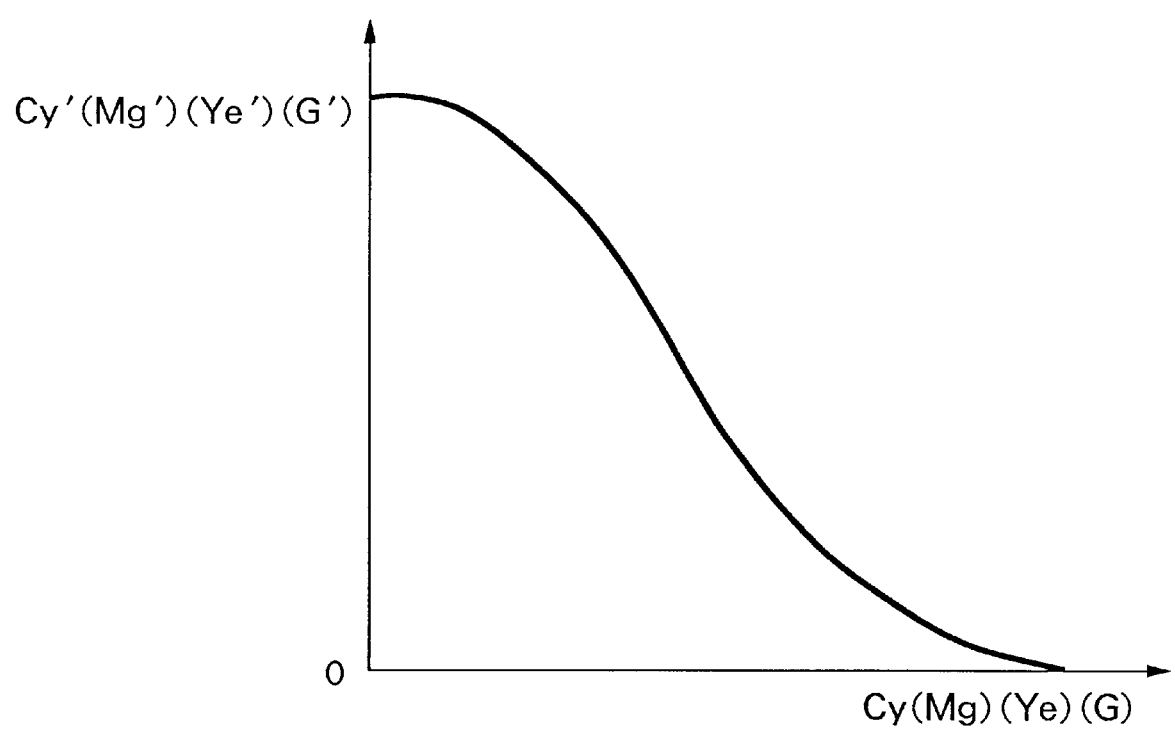
FIG. 14 is a graph showing input-output characteristics used in negative-positive conversion processing.

FIG. 14 shows a conversion curve used for negative-positive inversion when images are obtained from a negative film. This curve is determined in consideration of characteristics of a film. The curve may be changed depending upon a manufacturer and/or a type of a film.

Note, in the first embodiment, a CCD is covered with a complementary color filter, however, the present invention is not limited to this, and an RGB color filter may be used instead. In such case, a method of pixel shifting may be changed so that no unnecessary image data is obtained as a result of pixel shifting.

Further, if the complementary color filter is used, the number of image sensing positions (i.e., CCD positions in the first embodiment) are not limited to four, and by shifting the image sensing position only in the oblique direction, image data obtained at two image sensing positions may be combined.

Further, the dynamic range expansion processing is performed by using two images sensed in different luminous exposures in the first embodiment, however, the number of images to be used for dynamic range expansion processing is not limited to this. For example, three images sensed in three different luminous exposures may be used if memory has more room for storing one more image. Further, the graph shown in FIG. 3 is generated for all the color components (i.e., Cy, Mg, Ye and G), however, the present invention is not limited to this, and a graph or graphs of specific color component or components may be omitted.

Further, in the first embodiment, the pixel shifting is realized by shifting the CCD 2 by the CCD shifter 14, however, the present invention is not limited to this. For example, an optical plane parallel plate may be provided in the light path in the upstream of the CCD2 so as to shift the light path of an incoming light of an image, thereby shifting image formation positions on the CCD 2.

Furthermore, the first and second memories 5 and 6 are separately shown in FIG. 1 for the sake of better understanding, however, it is possible to use a single memory. Further, the DSPs do not have to be hard chips, and the processes performed by the DSPs may be software run by a CPU of a camera.

Further, the all the processes explained in the first embodiment are performed in the camera, however, these processes may be performed by a host computer by transferring data to the host computer.

FIG. 18 shows an explanatory view showing that the processes explained in the first embodiment can reduce the required memory capacity. In FIG. 18, (a) corresponds to a conventional method of storing all the data before processing any data, and (b) corresponds to a method of performing pixel shifting operation, first. (c) corresponds to the present invention in which dynamic range expansion processing is performed before pixel shifting processing. As seen from FIG. 18, the case of (c) requires about half of the memory capacity required in the cases of (a) and (b). In FIG. 18, one block indicates an amount of data of an image of 1,500,000 pixels.

<Second Embodiment>

Figure 15:
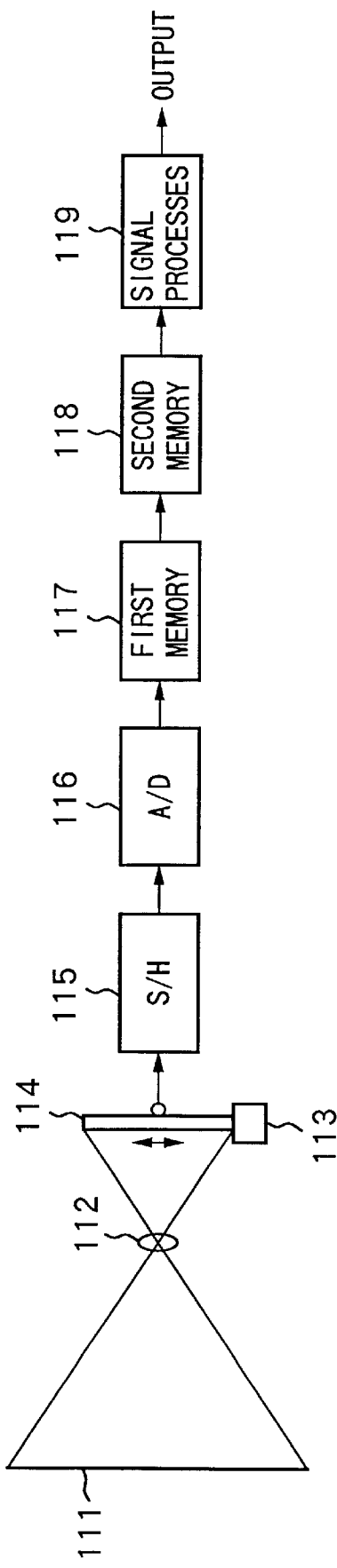
FIG. 15 is a block diagram illustrating a configuration of an image sensing system according to a second embodiment of the present invention.

A case when the present invention is applied to a line sensor is explained in a second embodiment. FIG. 15 shows a configuration of an image sensing system and flow of image signals in the image sensing system according to the second embodiment.

First, an image of an original 111 is formed on a line sensor 114 by an optical system 112. Data obtained from the line sensor 114 is converted into digital data via a sample-and-hold (S/H) circuit 115 and an analog-digital (A/D) converter 116, then stored in a first memory 117. By repeating the above processes to obtain digital data a plurality of times in different luminous exposures, image data obtained in different luminous exposures is stored in the first memory 117. The digital data stored in the first memory 117 is processed by a digital signal processor (not shown) to generate data of expanded dynamic range, or of improved S/N ratio. The dynamic range expansion processing performed here is the same as that performed in the first embodiment. The image data of expanded dynamic range is stored in a second memory 118.

After dynamic range expansion processing is performed on image data obtained at one image sensing position, an XY shifter 113 shifts the line sensor 114, and image data of expanded dynamic range is obtained at the shifted position, then the obtained image data is stored in the second memory 118.

After image data of expanded dynamic range is obtained at a plurality of predetermined image sensing positions and stored in the second memory 118, the stored data is read out and processed by a processing circuit 119 to generate image data of high resolution, then the resultant image data is outputted.

Figure 16:
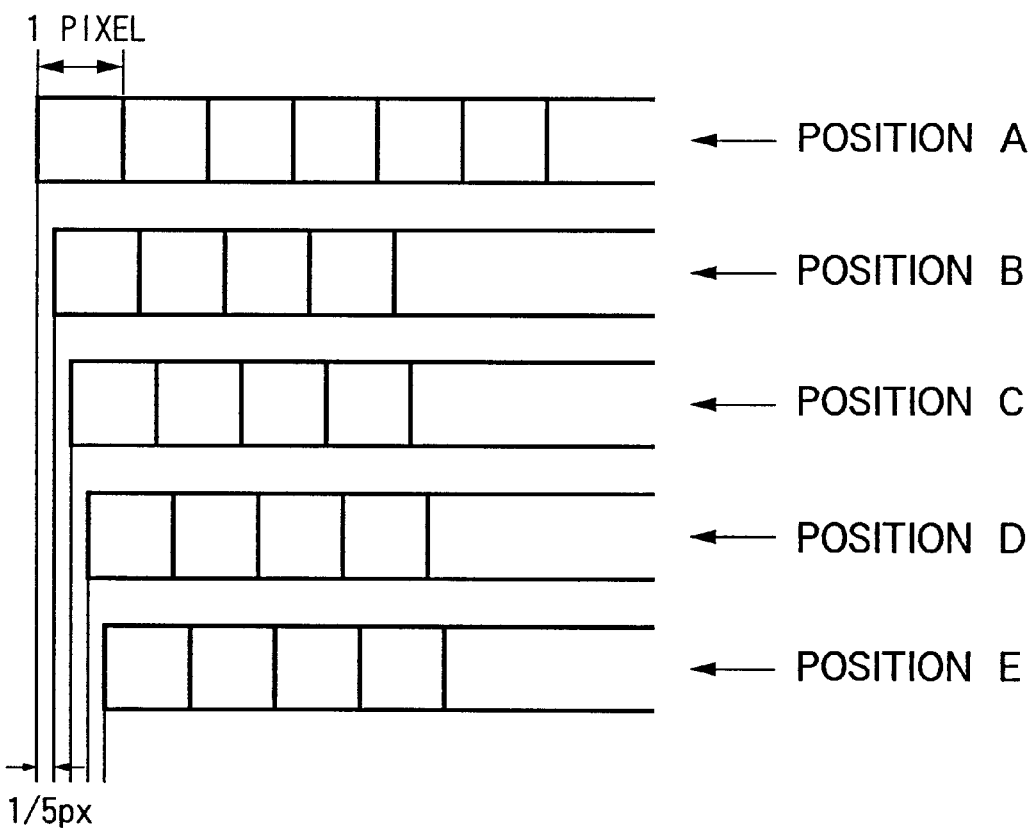
FIG. 16 is an explanatory view showing displacement of a line sensor.

FIG. 16 shows an example of predetermined positions of the line sensor 114 to be shifted to. The positions to which the line sensor 114 is shifted by one-fifth pixel (⅕ px) in the longitudinal direction of the line sensor 114 are shown as A to E.

In a case of performing dynamic expansion processing by using two images sensed in two different luminous exposures, e.g., 0 EV and +1 EV, conventionally, ten (=5×2) memory units (one memory unit is a capacity required for storing image data of one line) are required for storing all the image data obtained at each of the positions A to E, as shown in FIG. 17. In contrast, according to the second embodiment, two memory units for the first memory 117 and five memory units for the second memory 118, namely, the total of only seven memory units, are required. Thus, it is possible to reduce the required capacity of memories by 30%.

According to the first and second embodiments as described above, it is possible to realize a high-resolution digital image of expanded dynamic range, or improved S/N ratio, without increasing required capacity of a memory nor increasing manufacturing cost of a CCD.

The present invention is not limited to the above embodiments and various changes and modifications can be made within the spirit and scope of the present invention. Therefore to appraise the public of the scope of the present invention, the following claims are made.

What is claimed is:

1. An image sensing method comprising:
   an image sensing step of obtaining image data of a plurality of images of an object in a plurality of different luminous exposures;
   a first storing step of storing image data of said plurality of images of an object obtained in said image sensing step;
   a dynamic range expansion step of combining the image data stored in said first storing step and generating image data of a single image of expanded dynamic range;
   a second storing step of storing the image data of the single image generated in said dynamic range expansion step;
   a clearing step of clearing the image data stored in said first storing step;
   a shifting step of shifting an image formation position of the images of the object on an image sensing device to a plurality of positions;
   a repeating step of repeating said image sensing step to said clearing step at each image formation position shifted by said shifting step and generating image data of a plurality of images of expanded dynamic range; and
   a combining step of combining the plurality of images of expanded dynamic range obtained in said repeating step and generating image data of a single image of high resolution.

2. The image sensing method according to claim 1 further comprising a luminous exposure determination step of, on the basis of image data of an image sensed in a first exposure in said image sensing step, determining exposure or exposures which are different from the first exposure.

3. The image sensing method according to claim 2, wherein, in said luminous exposure determination step, when frequency of occurrence of signal level, which is larger than a predetermined value, of the image data of the image sensed in the first luminous exposure is larger than a predetermined number of times, a luminous exposure which is smaller than the first luminous exposure is determined as a second luminous exposure.

4. The image sensing method according to claim 2, wherein, in said luminous exposure determination step, when frequency of occurrence of signal level, which is larger than a predetermined value, of the image data of the image sensed in the first luminous exposure is smaller than a predetermined number of times, a luminous exposure which is larger than the first luminous exposure is determined as a second luminous exposure.

5. The image sensing method according to claim 1, wherein, in said image sensing step, image data of images of an object sensed in a first exposure, in a second exposure, and in a third exposure is obtained.

6. The image sensing method according to claim 2, wherein, in said image sensing step which is repeated in said repeating step, the same plurality of luminous exposures determined in said luminous exposure determination step are used.

7. The image sensing method according to claim 1 further comprising a compression step of compressing the image data obtained in said dynamic range expansion step.

8. The image sensing method according to claim 1 further comprising a compression step of compressing the image data obtained in said combining step.

9. The image sensing method according to claim 1 further comprising a gamma correction step of performing gamma correction on the image data obtained in said dynamic range expansion step.

10. The image sensing method according to claim 1 further comprising a recording step of recording the image data obtained in said combining step on a recording medium.

11. An image sensing apparatus comprising:
   image sensing means for sensing a plurality of images of an object in a plurality of different luminous exposures and outputting image data of the plurality of images;
   first storage means for storing the image data of the plurality of images of the object sensed by said image sensing means in the plurality of different luminous exposures;
   dynamic range expansion means for combining the image data stored in said first storage means and generating image data of a single image of expanded dynamic range;

second storage means for storing image data of a plurality of images obtained by said dynamic range expansion means;

clearing means for clearing the image data stored in said first storage means;

shifting means for shifting an image formation position of an image of the object on said image sensing means to a plurality of positions; and combining means for combining the image data, stored in said second storage means of a plurality of images of expanded dynamic range sensed at said plurality of positions shifted by said shifting means and generating image data of a single image of high resolution.

12. The image sensing apparatus according to claim 11 further comprising control means for controlling said dynamic range expansion means to generate image data of expanded dynamic range each time image data obtained by sensing a plurality of images in all the different luminous exposures at each position is stored in said first storage means, and to transfer the generated image data to said second storage means.

13. The image sensing apparatus according to claim 12, wherein said shifting means shifts the image formation position on said image sensing device to one or more predetermined image formation positions with respect to a reference image formation position, and said control means controls said combining means to generate image data of a single image of high resolution after image data of a plurality of images of expanded dynamic range sensed at the reference image formation position and all the predetermined image formation positions is stored in said second storage means.

14. The image sensing apparatus according to claim 13, wherein said image sensing means senses images of the objects at the reference position and all the predetermined positions in the same plurality of different luminous exposures.

15. The image sensing apparatus according to claim 11 further comprising luminous exposure determination means for, on the basis of image data of an image sensed by said image sensing means in a first luminous exposure, determining different exposure or exposures from the first luminous exposure.

16. The image sensing apparatus according to claim 15, wherein said luminous exposure determination means determines a luminous exposure which is smaller than the first luminous exposure as a second luminous exposure when frequency of occurrence of signal level, which is larger than a predetermined value, of the image data of the image sensed in the first luminous exposure is larger than a predetermined number of times.

17. The image sensing apparatus according to claim 15, wherein said luminous exposure determination means determines a luminous exposure which is larger than the first luminous exposure as a second luminous exposure when frequency of occurrence of signal level, which is larger than a predetermined value, of the image data of the image sensed in the first luminous exposure is smaller than a predetermined number of times.

18. The image sensing apparatus according to claim 11, wherein said image sensing means senses images of the object in a first exposure, in a second exposure, and in a third exposure.

19. The image sensing apparatus according to claim 11 further comprising compression means for compressing the image data obtained by said dynamic range expansion means before storing the image data in said second storage means.

20. The image sensing apparatus according to claim 11 further comprising compression means for compressing the image data obtained by said combining means.

21. The image sensing method according to claim 11 further comprising gamma correction means for performing gamma correction on the image data obtained by said dynamic range expansion means before storing the image data in said second storage means.

22. The image sensing apparatus according to claim 11 further comprising a recording means for recording the image data obtained by said combining means on a recording medium.

23. An image sensing method comprising:

an image sensing step of obtaining image data of a plurality of images of an object under different conditions;

a first storing step of storing said plurality of images sensed at said image sensing step;

a combining step of generating a single image from said plurality of images stored in said first storing step;

a clearing step of clearing said plurality of images stored in said first storing step after the generation of the single image;

a compression step of compressing the single image generated in said combining step;

a second storing step of storing the single image obtained in said compression step.

24. The image sensing method according to claim 23, wherein said image sensing step further includes, the image data of said plurality of images are obtained in a plurality of different luminous exposures.

25. The image sensing method according to claim 24, wherein said combining step further includes, a single image of expanded dynamic range is generated from said plurality of images stored in said first storing step.

26. The image sensing method according to claim 25, further comprising:

a shifting step of shifting an image sensing position with respect to the object;

a repeating step of repeating from said image sensing step to said second storing step each time the image sensing position is shifted; and a high-resolution image combining step of generating a single image of high resolution from a plurality of images stored in said second storing step.

27. An image sensing apparatus capable of performing a process of obtaining image data of a plurality of images of an object in a plurality of different luminous exposures, combining the image data of the plurality of images and generating a single image of expanded dynamic range, and a process of obtaining image data of a plurality of images of an object while moving image sensing positions with respect to the object, combining the image data of the plurality of images and generating a single image of high resolution, said apparatus comprising:

image sensing means for obtaining image data of a plurality of images of an object under different conditions;

first storing means for storing said plurality of images sensed at said image sensing means;

combining means for generating a single image from said plurality of images stored in said first storing means;

clearing means for clearing said plurality of images stored in said first storage means in response to the generation of the single image by said combining means; and second storage means for storing the single image generated in said combining means.

28. The image sensing apparatus according to claim 27, wherein said image sensing means obtains the image data of said plurality of images in a plurality of different luminous exposures.

29. The image sensing apparatus according to claim 28, wherein said combining means generates a single image of expanded dynamic range from said plurality of images stored in said first storage means.

30. The image sensing apparatus according to claim 29, further comprising:

shifting means for shifting an image sensing position with respect to the object;

control means for controlling said image sensing means, said combining means, said clearing means, and said second storage means to perform respective operations each time the image sensing position is shifted; and high-resolution image combining means for generating a single image of high resolution from a plurality of images stored in said second storage means.

31. An image sensing apparatus comprising:

an image sensing device for obtaining image data of a plurality of images of an object under different conditions;

a first storage device for storing said plurality of images sensed at said image sensing device;

a combining device for generating a single image from said plurality of images stored in said first storage device;

a clearing device for clearing said plurality of images stored in said first storage device after the generation of the single image by said combining device;

a compression device for compressing the single image generated by said combining device; and a second storage device for storing the single image compressed by said compression device.

32. The image sensing apparatus according to claim 31, wherein said image sensing device obtains the image data of said plurality of images in a plurality of different luminous exposures.

33. The image sensing apparatus according to claim 32, wherein said combining device generates a single image of expanded dynamic range from said plurality of images stored in said first storage device.

34. The image sensing apparatus according to claim 31, wherein said first storage device and said second storage device are configured on a same memory.

* * * * *

UNITED STATES PATENT AND TRADEMARK OFFICE
CERTIFICATE OF CORRECTION

PATENT NO.       : 6,418,245 B1
DATED            : July 9, 2002
INVENTOR(S)      : Yoshiro Udagawa It is certified that error appears in the above-identified patent and that said Letters Patent is hereby corrected as shown below:

<u>Title page,</u>
Item [*] Notice, the following was omitted:
--      This patent issued on a continued prosecution application filed under 37 CFR 1.53(d), and is subject to the twenty year patent term provisions of 35 U.S.C. 154(a)(2). --

Item [56], References Cited, U.S. PATENT DOCUMENTS, the following reference was omitted:
        --      5,661,822       8/1997   Knowles et al. …….382/233 --

<u>Column 13,</u>
Line 9, "data, stored" should read -- data stored --

Signed and Sealed this

Twelfth Day of November, 2002

*Attest:*

JAMES E. ROGAN
*Attesting Officer*    *Director of the United States Patent and Trademark Office*